Sept. 14, 1965  R. E. GORDINIER  3,205,644
FRUIT PICKER

Filed Aug. 17, 1962  2 Sheets-Sheet 1

Ralph E. Gordinier
INVENTOR.

BY *M. T. Sperry*
ATTORNEY

Sept. 14, 1965 R. E. GORDINIER 3,205,644
FRUIT PICKER
Filed Aug. 17, 1962 2 Sheets-Sheet 2
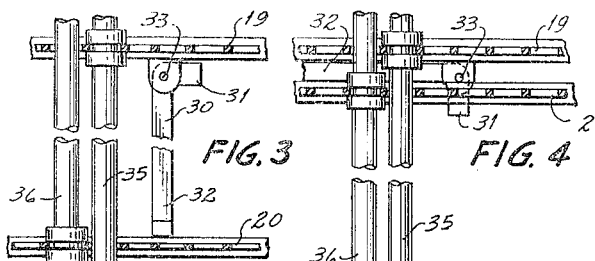
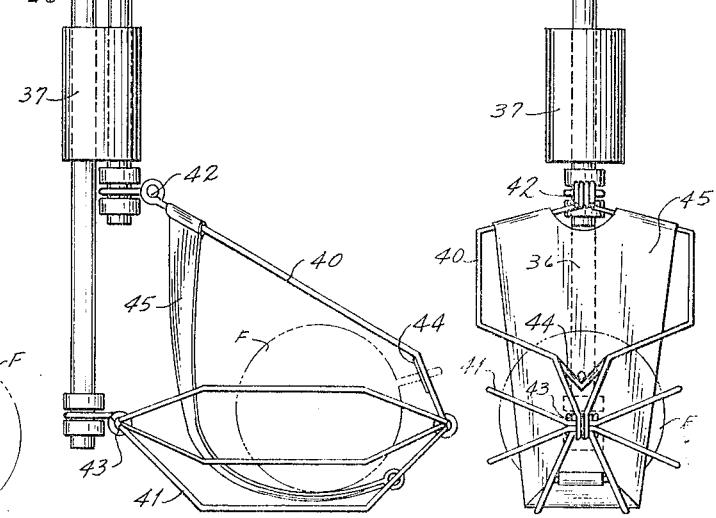
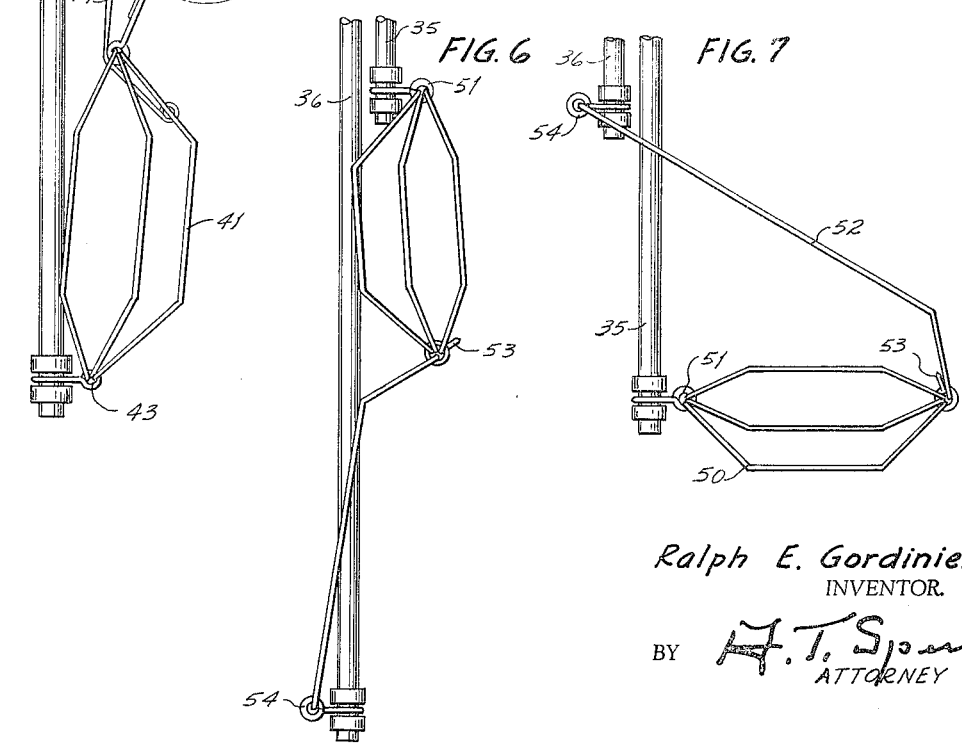
Ralph E. Gordinier
INVENTOR.
BY H. T. Spony
ATTORNEY

United States Patent Office 3,205,644
Patented Sept. 14, 1965

3,205,644
FRUIT PICKER
Ralph E. Gordinier, 605 E. Reynolds St., Plant City, Fla.
Filed Aug. 17, 1962, Ser. No. 217,685
2 Claims. (Cl. 56—328)

This invention relates to fruit pickers and is more particularly concerned with the picking and/or gathering of fruit and similar crops from trees, bushes and vines. While various aspects of the present invention may be applicable for the harvesting of crops of a wide variety of sizes, shapes, dimensions and growth forms, that form of the invention here shown by way of example is particularly designed for the picking of tree grown crops such as citrus fruit. The invention provides for the picking of fruit such as oranges, grapefruit, lemons, limes and the like, by the individual engagement of individual fruit and the cutting of the stem as an incident to such engagement without the aid of manual manipulation, without injury to the fruit or the tree and in simultaneous multiple manner.

Automatic harvesting of fruit has long been an objective of the inventors and developers of agricultural equipment; however, problems of expeditious and economical severance of the articles from the trees without damage and undue manual manipulation or selective individual handling, have not heretofore been solved in a mechanism which lends itself to practical application. This invention provides a simple, effective and efficient intrumentality for the rapid simultaneous severance and gathring of such fruit, or the equivalent from its normal attachment to shrub, vine or tree. The mechanism is readily portable to be move from tree to tree. The device is also susceptible of remote or ground control to selectively direct the locus of activity from tree to tree with a minimum of physical labor or effort, and is well designed to meet the demands of economic manufacture and operation. An important feature of the invention is the ability of the device to strip or totally pick the fruit of an individual tree in one location of the device. The invention also incorporates collection and conveying means for delivery of the picked fruit.

Figure 1:
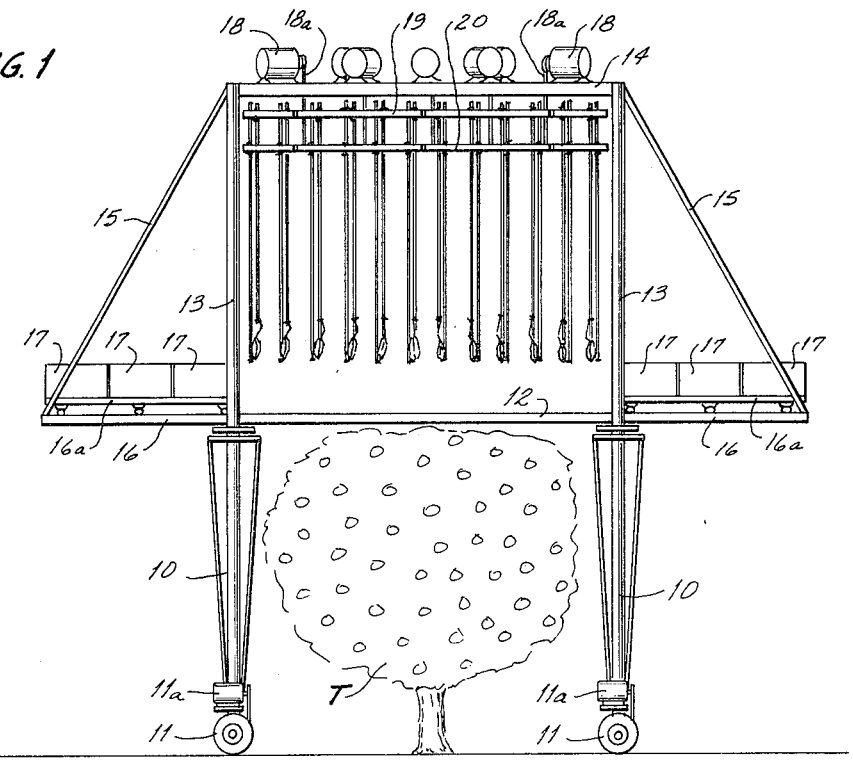
Figure 2:
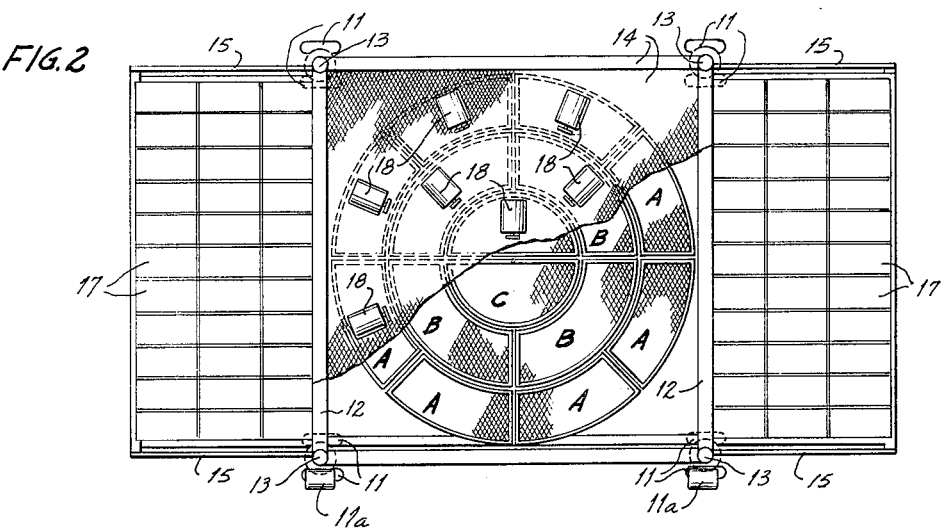

FIG. 1 is a side elevation of one presently preferred form of a total machine of the present invention, FIG. 2 is a top plan view of the apparatus disclosed in FIGURE 1, FIG. 3 is a side elevation of one form of the fruit receiving, harvesting and delivering cage, shown in collapsed position, FIG. 4 is a side elevation of the cage of FIGURE 3, showing the cage in fruit receiving position, FIG. 5 is a view similar to FIGURE 4 taken at right angles with respect thereto, FIG. 6 is an inverted form of the cage shown in FIGURES 3, 4 and 5, in collapsed position, and FIG. 7 is a view of that form of the invention shown in FIGURE 6 in fruit receiving position.

Referring more particularly to FIGURES 1 and 2 of the drawings, it will be seen that the total structure embraces the concept of a mobile carriage, having four vertical standards 10, mounted on wheels 11, which may be driven by individual motors 11a for independent drive in any selected direction for easy manipulation through a groove. As indicated by the tree T of FIGURE 1, it will be seen that the standards 10 are designed to be of such height as to place the picking mechanism above the top of the tree, and the rectangular arrangement of the standards 10 are such as to surround the tree T. Above the tree T, the standards 10 support a centrally open base framework 12. Thereabove, mounted on extensions 13 of the standards 10, there is supported a top platform 14 suitably braced by angular brace members 15. From the framework 12 lateral extensions 16 are provided to support pallets 16a which are arranged to support boxes or crates 17 for the reception of the fruit gathered from the tree. This arrangement is such that when the harvesting cages, hereinafter discussed, are raised to discharge the harvested fruit the boxes may be moved over the central opening of the framework 12 to receive the discharged fruit.

The top platform 14 supports a plurality of motors 18 which actuate through cables 18A the harvesting element plates 19 and 20, shown in FIGURES 3 to 7 inclusive hereinafter discussed. As will be noted from FIGURE 2, plates 19 and 20 are arranged as a group of independent segments, including outer segments A, intermediate segments B and central segments C. The outer segments A are preferably arranged as small arcs, there being two of such outer segments A for each intermediate segment B, and there being provided two intermediate segments B for each of the two central segments C. This arrangement is such that to conform with the natural generally global contour of a tree, the segments A will require deeper downward penetration than the segments B, and likewise the segments B will require a greater lowering to operate position than the central segments C. By this arrangement, it is understood that the motors 18 are provided one for each segment to control its downward movement and the operation of the cages. Thus, the arrangement is such that the entire apparatus may be operated in such manner as to conform with the various contours, sizes and shapes of the trees being harvested.

Turning now to FIGURES 3 to 5 for a consideration of the structure, arrangement and operation of the harvesting cages, it will be seen that the upper and lower plates 19 and 20 respectively, are relatively movable in vertical relation with respect to each other. Such movement is readily provided for by a bell crank 30, having a short arm 31 and a longer arm 32, and being pivoted on the underside of the upper plate 19 as at 33. With the arm rocked to the position shown in FIGURE 3, the longer arm 32 forces the lower plate 20 downwardly, while with the arm rocked in clockwise direction the longer arm will be disengaged from the lower plate 20. Depending from the upper plate 19 and secured thereto is a shaft 35. While secured to the lower plate 20 for vertical movement therewith, there is a shaft 36. The lower end of the shaft 35 has a bearing block 37 which engages the shaft 36. It will be seen that movements of the lower plate 20 with respect to a relatively fixed position of the upper plate 19, will provide for sliding motion of the shaft 36 through the bearing 37.

Each harvesting cage consists of a pair of pivoted elements comprising a top cover 40 and a lower open topped basket 41. The free end of the cover 40 is secured as at 42 to the relatively fixed shaft 35, while the free end of the basket 41, is secured to the lower end of the shaft 36, as at 43. The basket 41 of the cage, is defined by a group of substantially parallel wires, three in number, arranged in semi-circular relation. The cover 40 of the cage is defined by two parallel wires, widely spaced in such manner as to permit passage of fruit therethrough. As shown in FIGURE 3 with the shaft 36 in its lowermost position, the cage will be opened and stretched to form the upper and lower portions in a straight path of minimum transverse dimension. In this position the units constituting the picking elements may be readily thrust downwardly through the tree with a minimum of damage to branches and minimum resistance to such downward movement.

After the picking elements have been inserted into the tree in the vicinity of the fruit thereof, the bell crank 30 is moved to raise the plate 20 and hence the shaft 36 to the position shown in FIGURE 4. In this position the basket 41 is brought to a horizontal position with the cover 40 lying over and a slight angle to the horizontal position of the basket 41. Assuming the fruit F (FIGURES 3, 4 and 5) to have been in a position shown in FIGURE 3, as the cage descended, it will be seen that with the basket 41 in a horizontal position, the fruit will extend through the open cover 40 of the cage and be received in the basket 41. As indicated at 44, the cover 40 carries a knife blade 44 which will sever the stem of the fruit as the plates 19 and 20 move upwardly.

After the reception of the fruit within the cage and the severance of the stem as the closed cage moves upwardly, it will be understood that in a subsequent downward movement of the shaft 36 with respect to shaft 35, the cage will again be opened to the position shown in FIGURE 3 and the severed fruit will be discharged for reception in the picking boxes 17. To facilitate such discharge an elastic sheet 45 is provided to forcefully eject the fruit outwardly and away from the shafts 35 and 36.

In that form of the invention shown in FIGURES 6 and 7, the arrangement is substantially the reverse of the arrangement in FIGURES 3 to 5 inclusive. In this case, the basket portion 50 of the cage is secured as at 51 to the relatively stationary shaft 35, while the cover 52 is secured to the relatively movable shaft 36. Thus, when the shaft 36 descends below the end of the shaft 35, the cage will assume collapsed position, indicated in FIGURE 6. When, however, the lower end of the shaft 36 moves upwardly above the end of the shaft 35, the top portion 52 will draw the basket portion 50 outwardly to a vertical position for the reception of fruit and the severance of the stem in the manner described above. In the collapsed position, shown in FIGURE 6, the cage may, of course, easily pass downwardly through the branches of the tree to a position where the fruit may be received by the lowered basket when in horizontal position, as shown in FIGURE 7. As in the manner above, when the plates are moved upwardly, the fruit may be readily discharged when the cage parts return to the position shown in FIGURE 6. While each pair of shafts are here shown as provided with only one cage, it will be understood that multiple cages may be provided for each pair of shafts in the same plane and/or in vertical spaced relation.

From the foregoing, it will be seen that the present invention provides a novel, practical, efficient and effective means for gathering fruit. The arrangement provides for the gathering of the entire fruit of a tree by one single disposition of the apparatus over each tree. The segmental arrangement of the picker units, as referred to with respect to FIGURE 2, provides for the accommodation of these units to conform with the specific characteristics of the tree, the outer units dropping deeper to conform with the outer peripheral lower branches of the tree and the inner segments B being arranged to accommodate the intermediate portion of the tree, while the top segment C will gather the fruit from the top or center of the tree. It will be seen that the invention provides for a relatively easy entry of the picker units to the tree in their collapsed condition, and that relative movement of the shafts 35 and 36 provides for a horizontal disposition of the cages to receive the fruit and sever the stems. So, it will be seen that on reverse movement, fruit will be dispatched from the cage for delivery to the picking crates 17. Conveyor mechanism not shown may be readily provided for delivering the boxes to the ground.

It will, of course, be understood that the present invention as set forth is one preferred embodiment thereof and that the invention is in no way confined to the specific structural details herein set forth. Thus in the practice of the invention numerous changes, modifications and the full use of equivalents may be resorted to without departing from the spirit or scope of the invention, as outlined in the appended claims.

What I claim is:

1. In a fruit picker of the character set forth, a wheeled vehicle including standards, a lower centrally open framework supported by said standards, an upper platform, vertical extensions of said standards supporting said upper platform above said framework, and vertically movable pickers supported from said upper platform, said pickers being arranged in independently movable arcuate groups, each picker including a hinged cage.

2. In a fruit picker of the character set forth, a wheeled vehicle including standards, a lower centrally open framework supported by said standards, an upper platform, vertical extensions of said standards supporting said upper platform above said framework, and vertically movable pickers supported from said upper platform, said pickers being arranged in independently movable arcuate groups, each picker including a hinged cage having individually hinged elements and relatively movable shafts separately attached to the individual hinged elements of the cage whereby relative movement of the shafts will open and shut said cages.

References Cited by the Examiner

UNITED STATES PATENTS

| | | | |
|---|---|---|---|
| 106,022 | 8/70 | Apperly | 56—36 |
| 309,521 | 12/84 | Case | 56—333 |
| 670,953 | 4/01 | Faurest | 56—333 |
| 1,022,142 | 4/12 | Johnson | 56—14 |
| 1,080,127 | 12/13 | Swindell | 56—36 |
| 1,231,116 | 6/17 | Bender | 56—333 |

ABRAHAM G. STONE, *Primary Examiner.*

RUSSELL R. KINSEY, T. GRAHAM CRAVER,
*Examiners.*